Figures 1, 3:
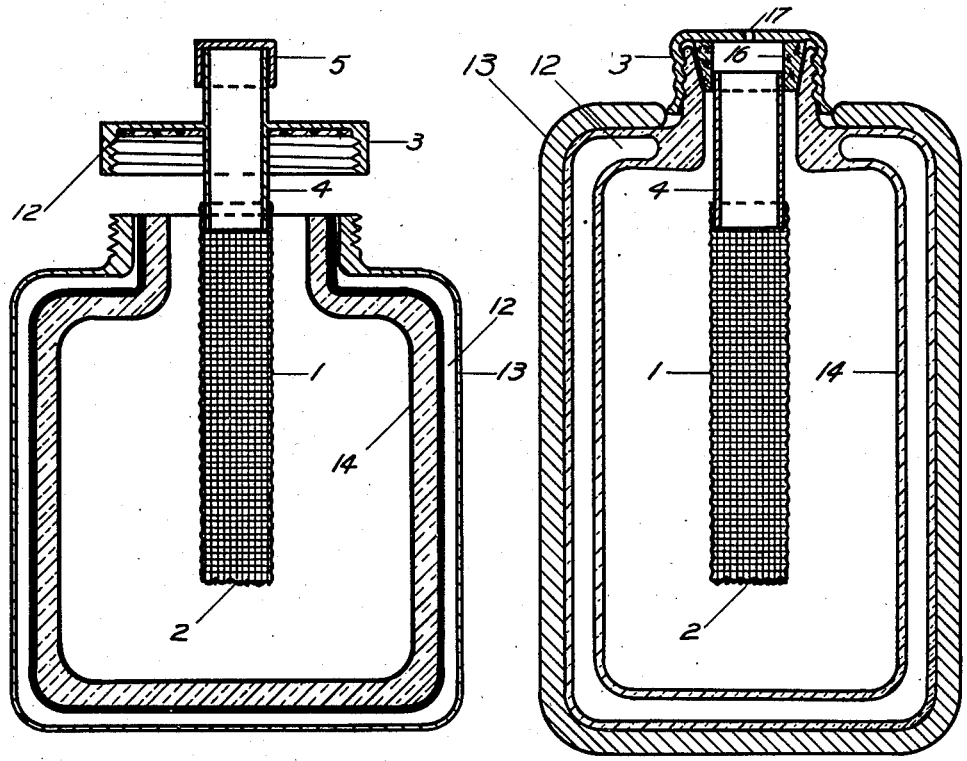

Sept. 22, 1936.   W. M. DEHN ET AL   2,055,096
INFUSION APPARATUS
Filed Oct. 17, 1932

William M. Dehn
John W. Boale
INVENTORS

Patented Sept. 22, 1936

2,055,096

UNITED STATES PATENT OFFICE 2,055,096

INFUSION APPARATUS

William M. Dehn and John W. Boals,
Seattle, Wash.

Application October 17, 1932, Serial No. 638,212

3 Claims. (Cl. 53—3)

This invention relates to apparatus and the art of preparing infusions of coffee, tea and other beverages. It is well known that the quality of the beverage, as prepared, for example, from the same samples of coffee, varies widely when different physical conditions are applied. Recognition of variability of quality of coffee infusions has brought about development of numerous types of pots, percolators, drip appliances, etc. designed to apply favorable physical conditions for brewing coffee. These appliances, however, may yield quite different qualities of the beverage, because the variables, time, temperature, and atmospheric oxidation have dissipating and deteriorating effects upon the volatile oils, the most important components imparting taste and odor to teas and coffee. It is well known that these oils are thermo-sensitive, and can largely be dissipated or modified by storage, by prolonged or excessive heat, and by atmospheric oxidation, so that the beverages are weak or possess a stale taste. The desirable freshness of taste of the original oils or the undesirable loss and staleness of modified oils largely qualify good or bad infusions. The process disclosed by this specification yields coffee of strong aromatic taste with visible droplets of oil floating on the surface.

The second component of teas and coffees that is desirable in the beverages is caffeine. Its concentration in the water may vary even when uniform grains of the teas or coffees are used, for the reason that penetration of the grains by the water is influenced by time, temperature and the evolution of gas. In general, continued boiling contributes to the increase of caffeine but to the decrease of the volatile oils, hence pot methods, employing continued boiling, cannot give desirable concentrations of both of these components. Percolators and drip appliances are more successful but these also commonly are not satisfactory because continued or excessive heat must be applied and these effect loss or chemical change of the oils.

Also most of these appliances, being constructed largely of metals, the hot beverages are brought into contact with said metals, and these impart undesired tastes to the beverages.

Our invention substantially avoids the recited adverse conditions and introduces novel features, so that a desired quality of beverage can uniformly be obtained.

One of the most important conditions employed in our apparatus and process comprises the application of no external heat—the coffee grains, for example, and the hot water are placed in a vacuum-type receptacle and this is immediately covered. The advantage here is that temperatures less than 100° C. can be employed, thus the dissipation, decomposition and oxidation of the volatile oils can be minimized and the desired freshness of taste and odor of the beverage can be preserved. Also because lower temperatures can be employed, stronger or weaker beverages, as influenced by different concentrations of caffeine, can be brewed with substantially equal qualities of taste. Finally, because beverages can thus be prepared at lower temperatures, they can be served at immediately drinkable temperatures.

It is commonly thought that boiling temperatures are necessary for the brewing of coffee, but for reasons recited and proven by experiments with our self-contained, heat-insulated, airtight shaker apparatus a superior quality of coffee can be brewed at many degrees lower temperatures than 100° C.

Measurements were made on the same sample of coffee under uniform conditions so that percentages of extractable solids were obtained.

| Degrees centigrade | 5 min. | 20 min. |
|---|---|---|
| 100 | 1.14 | 1.40 |
| 90 | 1.08 | 1.33 |
| 80 | 1.06 | 1.30 |
| 70 | 1.00 | 1.27 |

The percentages were found to vary narrowly with times and temperatures but the desirable aromatic taste and visible floating droplets were better conserved with the lower temperatures. In other words, better coffee can be prepared at temperatures of 70–90° C. than at 100° C. and these lower temperatures can be obtained practicably without the use of thermometers by adding an estimated quantity of cold water to the boiling water used to prepare the beverage.

Conservation and control of lower temperatures in our insulated, self contained, airtight apparatus capable of being shaken without loss of liquid and adapted for filtering and delivery of beverage without disassemblage of parts so as to obtain desired extraction and filtration, without loss of oil, constitute elements of the novelty of our invention.

The second advantage of our apparatus resides in the adaptability of the apparatus to be shaken, thus speeding up the preparation of the beverage, as well as yielding when desired, palatable beverages with temperature lower than 100° C. With vigorous agitation this "shaker coffee" prepared in this apparatus, which is somewhat similar to a cocktail shaker, can be served, if so desired, in less than two minutes, thus the apparatus is of the type to produce "instant coffee".

Also because longer shaking and standing yield, without loss of aromatic oils, a maximum of strength of beverage, as indicated by the percentages of extractable matter, less coffee will yield beverages whose strength is equal to that prepared by other methods with greater quantities of coffee.

Also, on the other hand, because a heat-insulated, air-tight type of container is employed, the serving of the beverage can be delayed substantially for a long period. Or without shaking or without further attention, the charged apparatus can be set aside and the serving can be made when convenient or when desired. In other forms of apparatus the time of contact of coffee grains with boiling water is usually given as 3–5 minutes. We have found that hours of contact at the lower temperature does not substantially lower the quality of the beverage.

The third advantage resides in the vacuum or other heat-insulated type of container, which not only conserves the heat of the beverage but also insulates the exterior so that shaking can be made while holding with the bare hands. Furthermore, the inner walls of the container, being constructed of glass, porcelain, enamelled metals or other non-metallic materials, imparts no metallic taste to the beverages.

Figures 2, 4, 5:
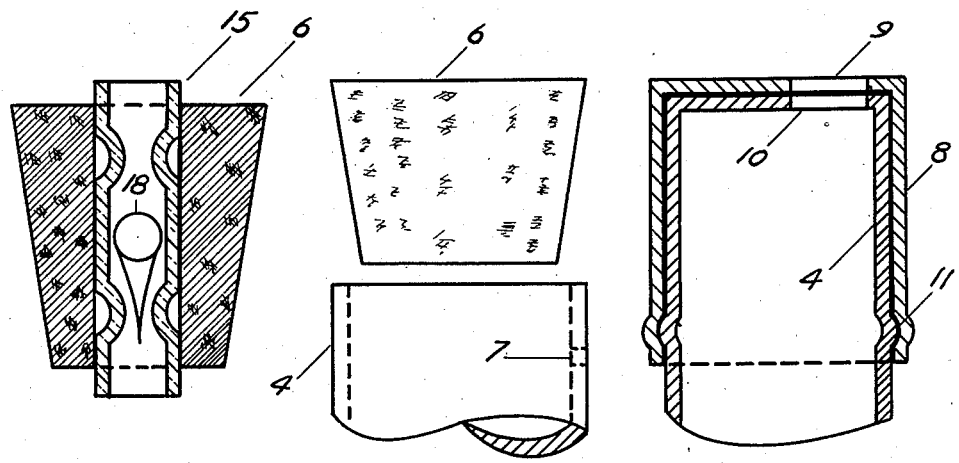

The five figures of our drawing, are vertical sections of our apparatus and stoppers depicting blow-out valves. Figures 1 and 3 are types of insulated containers, carrying stoppers, screens and blow-out valves. Figures 2, 4 and 5 show modifications of stoppers and blow-out valves. Further details of these forms are given in the text following.

A mechanical feature adapted to our apparatus and process comprises the blow-off valve which is shown 5 of Figure 1, 5 and 18 in Fig. 2, in 17 of Fig. 3, in 7 of Fig. 4 and in 9 of Fig. 5. This is adapted to permit the escape of heated air contained in the apparatus and also the carbon dioxide evolved by contact of hot water with the grains. The carbon dioxide advantageously displaces some of the heated air and thereby substantially inhibits oxidation of the volatile oils. Furthermore this blow-off valve permits shaking of the apparatus, without ejection of the beverage.

The above recited combined advantages of our process and self contained shaker apparatus has necessitated the invention of the novel type of strainer depicted in 1 of Fig. 1. This is a fine-mesh cylindrical gauze conveniently composed of brass and plated with nickel, chromium or any other metal that is not acted upon by the components of hot beverages. After the apparatus is charged and shaken, it is inverted so as to pour out the beverage. This screen then acts not only as a filter but also as a means for the admission of air to that part of the apparatus vacated by filtered beverage.

The novelty of the screen, affixed to and extending axially below the cover shown in 3 of Fig. 1, resides in the inverse outlet of filtering, that is, the liquids pass from the exterior to the interior of the screen, while the dregs remain on the exterior side. In other appliances the grains enter or are contained in screen capsules and the liquid passes from the interior to the exterior of the screens. Thus it is obvious that this inverse filtering screen, as applied to beverages, is novel and its operation both as a filter and as an air interchanging device, makes possible a self-contained apparatus, from which beverages can be removed without disassembling, without inconvenience and without involving adverse conditions. Obviously this screen, if constructed of glass, porcelain or the like, and operating either with or without paper or cloth capsules covering the same, constitutes no departure from our device of inverse filtering and interchanging of air. Likewise a separate tube-inlet for air, combined with an inverse filtering screen does not involve novelty not possessed by our device but falls within the scope of our claims.

If this strainer is not sufficiently wide or long, we have found that air does not continuously interchange places with the filtering beverage so that little or discontinued filtering, as well as inconvenience of serving of the beverage, result. Also we have found that too fine a mesh of screen can check the filtering process for the reason that the surface tension of the water films on the screen may be stronger than the atmospheric pressures exerted on it to break the films. We overcome these difficulties by employing suitably sized strainers constructed, for example, of 60 mesh gauze or preferably of 100 mesh gauze with the end of the strainer at the point 2 of Fig. 1 of larger mesh gauze, so that, when the apparatus is inverted, free passage of air through this part is brought about. The inner filter possesses the further advantage of easy washing, since a stream of water within the screen readily removes adhering grains.

Another element of novelty is the tubular extension 4 of the screen which is attached to and projects above the cover so as to serve not only as a pour-out and an air inlet but also as a carry for the cork 6 in Fig. 4 or for the cap 5 in Fig. 1 in which certain notched threads, or holes through the pour-out, afford means for the release of interior pressure when said cap is partly affixed. The vacuum type of apparatus suitably charged, for example, with coffee grains, a little cold water and the hot water, is covered but is not tightly capped. When the excess of heated air and carbon dioxide have had time to blow out, the apparatus is tightly capped and is shaken, after which the beverage can be served anytime during the next few hours, simply by removing the cap and pouring directly into the cups in which the beverage is served.

The form of apparatus depicted in Fig. 1 permits of shaking and delivery of beverage without disassembling of parts other than the cap 5. Fig. 5 shows one adaption of the cap whereby no disassembling of parts is necessary, the part 8 being held at 11, so that rotation of the cap puts openings 9 and 10 in line for outflow of air or of beverage and further rotation renders the apparatus substantially water tight.

The forms depicted in Fig. 1 and Fig. 3 contain all the features recited above. The non-metallic inner wall 14 is surrounded as shown in 12 by a vacuum or by insulating material and the outer walls are shown in 13. It is understood that numerous variations of designs incorporating these features disclosed by this specification can be made. For examples, instead of vacuum types of container, the insulation of heat can be made by asbestos, felt, cork or other material surrounding the container as shown in 12 and 13 of Fig. 1. The container may be long, squat, or otherwise, with or without handles, or it may be detachably mounted on an inverting frame. The screen may be cylindrical, conical or prismatic. The pour-out spout may be straight or curved; it may carry a spring cap for a blow-out. A separate tube may be adapted for a blow out and an inlet of air. The blow off valve may be of the type described or of the ball-in-bulb type shown in Fig. 2 which depicts a doubly corrugated glass tube 15 containing a hollow bulb with tail 18 and is seated in the cork 6.

A simple combination of the recited principles is a commercial vacuum bottle, charged with the materials and stopped by this ball-in-bulb valve. After standing, then shaking, this valve is replaced by a simple cork 16 carrying the inverse filtering screen 1.

Another simple form is shown in Fig. 3 wherein the cover screws down tightly on the cork holding the inverse filtering screen. A hole 17 in the top of the cover is adapted as a blow out and is serviceable provided too violent shaking is not employed.

Having now described our apparatus it is obvious that it can be used to brew not only hot beverages, such as coffee and tea, but also certain cold beverages prepared by shaking liquids and solids, including ice.

We claim:

1. Apparatus for preparing infusions comprising an open mouth container for the reception of liquid and solids, a cap for the mouth of said container supporting an elongated strainer extending into the chamber of said container, the mouth of said strainer member extending through and out beyond said cap, said cap sealing the container mouth except through the mouth of said strainer member, an independently removable closure for the mouth of said strainer member, said strainer member being of a very fine mesh for straining out the solids, the meshes being so fine that pressure of incoming air will not overcome the surface tension of liquid in its apertures, and a small portion of said screen at the opposite end from the mouth being of coarser mesh of a size just large enough to, when wet, allow air to enter freely.

2. Device of claim 1 in which the strainer extends axially of the container and the coarser mesh portion thereof is closer to the bottom of the chamber than to the open mouth top of the chamber.

3. Apparatus for preparing infusions comprising a portable vacuum-insulated container having an open mouth at the top thereof, a cap for the mouth of said container supporting an elongated strainer member having an impervious throat extending through said cap and beyond it inside and out, a separate closure cap for the outer end of said throat, said strainer member, beyond the inner end of the throat, being a filter of a very fine mesh, its openings being smaller than would allow air pressure difference in pouring to break the surface tension therein when wet, and the bottom end being of a coarser screen of mesh just large enough to allow air pressure difference in pouring to break the surface tension when wet.

WILLIAM M. DEHN.
JOHN W. BOALS.